United States Patent Office 3,561,121
Patented Feb. 9, 1971

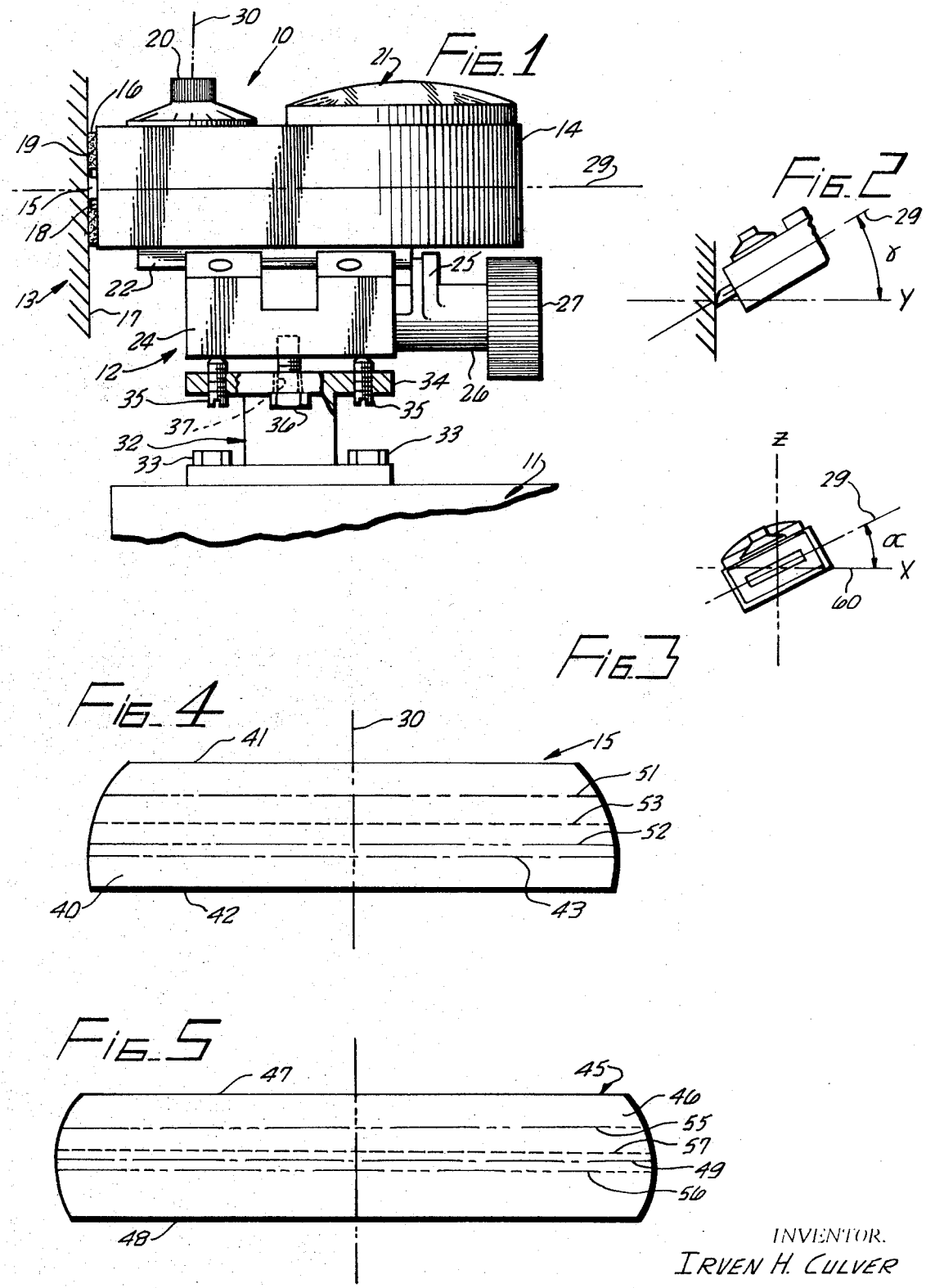

3,561,121
DISTANCE MEASUREMENT WITH FRICTION WHEEL DEVICES
Irven H. Culver, Playa del Rey, Calif., assignor to Primus Mfg., Inc., San Lorenzo, Puerto Rico, a corporation of California
Continuation-in-part of application Ser. No. 793,856, Jan. 24, 1969. This application Apr. 7, 1969, Ser. No. 813,851
Int. Cl. G01b 3/12
U.S. Cl. 33—125
4 Claims

ABSTRACT OF THE DISCLOSURE

The periphery of the metering wheel of a friction wheel distance measuring device has a parti-spherical configuration and has its maximum diameter more proximate to one end face of the wheel than to the other end face to enable disposition of the wheel to compensate for measurement errors produced by metal elastic crawl in a measurement surface engaged by the wheel and to compensate for repeatability errors produced by non-reciprocal deflections in structure to which the device is mounted in use.

CROSS-REFERENCE TO RELATED APPLICATIONS

This application is a continuation-in-part of application Ser. No. 793,856, filed Jan. 24, 1969. The subject matter of this application pertains to the subjects dealt with in U.S. Pats. 3,307,265 and 3,378,929.

Field of the invention

This invention pertains to precision distance measuring in machine tools, for example, by use of friction wheel distance measuring devices. Specifically, this invention pertains to an improved configuration of the frictionally driven metering wheel of a distance measuring device of the general type shown in Pat. 3,378,929.

Review of the prior art

U.S. Pat. 3,378,929 describes a precision friction wheel distance measuring device which has found wide acceptance throughout industry in many applications. A common use of this measuring device is in combination with machine tools where the measuring device is used to measure the distance one part of a machine tool is moved relative to another part of the tool. For example, a friction wheel measuring device is often mounted to a lathe carriage to engage a guideway surface of the lathe bed to measure the distance the carriage is moved along the lathe bed. It should be understood, however, that such devices are not restricted to use on lathes and have in fact found many other uses including in coordinate measuring machines and precision positioning mechanisms, as well as on any other type of machine tool.

The friction wheel measuring device which currently is most widely used is shown in Pat. 3,378,929. This device is marketed in the United States in conjunction with the trademark TRAV-A-DIAL, and features internal motion amplification of the rotation o fthe frictionally driven metering wheel, which has a six inch circumference, so that the distance of travel monitored by the wheel is precisely presented on dials graduated in inches and in tenths, hundredths, and thousandths of an inch.

For the purposes of this invention, it is noteworthy that FIG. 2 of Pat. 3,378,929 shows that the metering wheel has a cylindrical peripheral surface. That is, the surface of the metering wheel which is engaged with the measurement surface is a right circular cylinder disposed coaxially of and concentric to the axis of rotation of the metering wheel.

Subsequent to the development of the structure shown in Pat. 3,378,929, it was discovered that measurement errors were encountered during use of such devices in situations where the metal defining the measurement surface had values of Poisson's ratio and modulus of elasticity (Young's modulus) different from the corresponding values of the metal defining the metering wheel. Inasmuch as the metering wheel is made of a material having a very high value of modulus of elasticity and a relatively high value of Poisson's ratio, the values of Poisson's ratio and Young's modulus associated with the measurement surface are normally such as to cause the metering wheel, in use, to appear larger than is actually the case. That is, if the metering wheel has a circumference of six inches and is engaged with appropriate force (to assure faithful rolling of the metering wheel without slippage) with the measurment surface and is moved an actual distance of six inches along the measurement surface, the device will have an indicated distance of travel less than six inches. The magnitude of this difference may be as much as 0.0035 inch where the measurement surface is defined by aluminum. In effect, the relatively softer material of the measurement surface tends to gather or crawl under the metering wheel because of a phenomenon which exists where a small surface volume of a large body of metal is subjected to compressive loads and which may be referred to as a "metal gathering effect" or "metal elastic crowding."

In effect, therefore, metal elastic crowding is a phenomenon which varies in magnitude from metal to metal and which causes the metering wheel of the device shown in Pat. 3,378,929, for example, to appear, to one degree or another in use, to be larger than it actually is. To overcome the measurement errros associated with the phenomenon of metal elastic crowding, and yet to provide a device which could be used in a wide range of practical situations, it was found that measurement errors attributable to metal elastic crowding could be avoided by giving the peripheral surface of the metering wheel a parti-spherical configuration rather than a right circular configuration. In use, the device is mounted so that the plane of rotation of the metering wheel is tilted out of exact perpendicularity to the measurement surface, thereby to effectively decrease the effective circumference of the metering wheel relative to the carefully controlled and predetermined maximum circumference thereof by an amount adequate to compensate for measurement errors attributable to metal elastic crowding phenomena. Pat. 3,307,265 pertains to this improvement.

It is noteworthy, however, that U.S. Pat. No. 3,307,265, especially in FIG. 2 thereof, discloses that the maximum circumference of the metering wheel be located essentially midway between the upper and lower end faces of the metering wheel, and that the plane of intersection of the peripheral surface of the metering wheel with any plane radially through the metering wheel from the axis of rotation be symmetrical about a plane parallel to and essentially equidistant between the wheel end surfaces. Accordingly, measurement errors attributable to metal elastic crowding phenomena could be corrected by tilting a device according to U.S. Pat. No. 3,307,265 either up or down relative to the measurement surface.

Both of U.S. Pat. Nos. 3,378,929 and 3,307,265 clearly teach that the plane of rotation of the metering wheel be maintained parallel to the direction of movement of the measuring device along the measurement surface.

As used herein, the term "parti-spherical surface" shall be understood to refer to the surface of a sphere defined between two parallel planes both passing through the sphere and having a distance therebetween less than the diameter of the sphere; a parti-spherical surface as herein defined in a special case of a spherical zone. In the case of the parti-spherical surface disclosed in U.S. aPt. No. 2,307,-265, the sphere cutting planes are disposed essentially equidistantly from, on opposite sides of, and parallel to a plane through the diameter of the sphere.

In the present description, upward tilting of the measuring device relative to the measurement surface is tilting of the rear end (the end opposite from the metering wheel) of the device in an upward direction relative to the front end of the device. Conversely, downward tilting is that tilting which is associated with movement of the rear end of the device downwardly relative to the front end of the device from which the metering wheel projects into contact with the measurement surface.

Subsequent to the development of the invention described in U.S. Pat. No. 3,307,265 and essentially with the advent of a friction wheel measuring device having a readout capacity greater than that of the circumference of the metering wheel, it was found that the measuring device showed errors in repeatability (failure to return to a zero reading) following several cycles of movement of the device over long distances along the measurement surface; repeatability errors were found to exist notwithstanding that the device produced accurate measurements in moving in either direction. The patent application of which the instant application is a continuation-in-part describes certain procedures which effectively compensate for repeatability errors associated with cyclic travel of the measuring device over large distances, i.e., distances substantially in excess of six inches. Briefly, the above-referenced copending application states that repeatability errors are attributable primarily to non-reciprocal deflections both in the structure of the machine tool, for example, to which the measuring device is mounted, and in the structure mounting the measuring device to the machine tool. As explained in the copending application, such deflections are not reciprocal because they are different in sense and magnitude for one direction of movement of the lathe carriage, for example, along the lathe bed than for movement of the carriage in the opposite direction. Such non-reciprocal deflections affect measurements produced by the measuring device to the extent that such deflections produce either (1) skew tracking of the metering wheel relative to the direction of gross relative movement of the device along the measurement surface, (2) variations in the pitch (the tilt of the metering wheel relative to the measurement surface for purposes of compensation of errors attributable to metal elastic crowding) of the metering wheel relative to the measurement surface, or (3) variations in the force of engagement of the metering wheel with the measurement surface. These three effects may be produced simultaneously or separately by the above-described non-reciprocal deflections of the lathe carriage of the mounting bracketry securing the measuring device to the lathe carriage. If these deflections were reciprocal, i.e., were the same in sense and magnitude, for both directions of travel of the lathe carriage along the lathe bed, the measuring device would manifest no or only negligible repeatability error.

Effective and practical implementation of the procedures described in the above-mentioned copending application is hindered and in some cases made impossible where the metering wheel has the peripheral configuration shown in U.S. Pat. No. 3,307,265.

SUMMARY OF THE INVENTION

This invention provides simple, economic and efficient improvements in the configuration of a metering wheel in a friction wheel measurement device. These improvements retain the advantages provided by the improvements described in U.S. Pat. No. 3,307,265 and assure practical and efficient implementation of procedures described in the above-identified copending application.

Generally speaking, the present invention resides in a measuring device having a rotatable circular metal metering wheel of precisely predetermined circumferential extent. The metering wheel has opposite end faces spaced along the axis of wheel rotation. The measuring device includes means for rotatably mounting the wheel so that the periphery of the wheel is engageable in frictionally driven rolling engagement with a metal surface along which measurements are to be made. The device also includes means operable in response to rotation of the wheel for indicating precisely the distance the wheel mounting means moves relatively along the metal measurement surface. In this context, then, the present improvement comprises a peripheral surface on the metering wheel curved convexly radially outwardly of the wheel about the circumference of the wheel. The wheel peripheral surface is configured and arranged so that the line of maximum circumferential extent around the wheel lies in a plane perpendicular to the wheel axis of rotation and is substantially more proximate to one wheel end face than to the other end face. The outwardly convex wheel peripheral surface has a curvature, in cooperation with the extent of such surface axially of the wheel, sufficient that the plane of rotation of the wheel is pivotable only in one direction relative to the measurement surface to vary, by an amount adequate to compensate for localized deformation phenomena in the wheel and in the measurement surface, the effective circumference of the wheel relative to the precisely predetermined circumferential extent of the wheel.

BRIEF DESCRIPTION OF THE DRAWINGS

The above-mentioned and other features of this invention are more fully set forth in the following detailed description of a presently preferred embodiment of the invention, which description is presented with reference to the accompanying drawings wherein:

FIG. 1 is a side elevation view of a friction wheel measuring device mounted between two relatively movable elements (a lathe carriage and a lathe bed being selected for the purposes of illustration), the extent of which movement is to be measured;

FIG. 2 is an elevation view showing alignment of the device to obtain compensation for metal elastic crowding measurement errors;

FIG. 3 is a front view of the measuring device and illustrates the manner in which the device is mounted in use to obtain compensation for repeatability errors attributable to non-reciprocal deformations in the structure to which hte measuring device is mounted;

FIG. 4 is an enlarged elevation view of a metering wheel configured according to the present invention; and FIG. 5 is an enlarged elevation view of a metering wheel configured according to the disclosures of Patent 3,307,265.

DESCRIPTION OF THE PREFERRED EMBODIMENT

FIG. 1 illustrates the mounting of a friction wheel distance measuring device 10 to a lathe carriage 11, for example, by a mounting assembly 12 for measurement of the distance which the lathe carriage moves relative to the lathe bed 13. The measuring device includes a housing 14 within which is rotatably mounted a circular metering wheel 15 of carefully predetermined and known circumferential extent. The metering wheel is mounted in the housing so that the rim of the wheel projects beyond a front face 16 of the housing into contact with a measurement surface 17 defined by the lathe bed and along which measurements are to be made of the amount of travel of the lathe carriage relative to the bed. The metering wheel projects through an opening 18 in a piece of felt 19 which serves as a wiper for clearing measurement surfaces 17 of metal chips and other foreign particles which might interfere with operation of the measuring device.

A gross measurement indicator dial 20, calibrated in inches and tenths of inches, is disposed on the upper surface of the housing and is coupled directly ot the saft (not shown) which supports the metering wheel. A fine measurement indicator 21 for indicating small increments of measured travel is also mounted to the upper surface of the housing. Indicator 21 includes a dial plate (not shown) calibrated in hundredths and thousandths of an inch and a rotatable pointer (not shown) which cooperates with the dial plate and which is coupled to the metering wheel via an anti-backlashed motion-amplifying gear train (not shown); see Pat. 3,378,929. Any angular movement of the metering wheel about its axis of rotation is immediately manifested by indicators 20 and 21, which, in combination, serve to indicate the distance which the metering wheel has travelled along the measurement surface.

A male dovetail member 22 is secured to the underside of housing 14 and has its length aligned parallel to the elongate extent of housing 14, which extent is also preferably disposed perpendicular to measurement surface 17 during use of the measuring device. The male dovetail member cooperates in a female dovetail grove (not shown) provided in the upper surface of a mounting block 24 which comprises the upper component of mounting assembly 12. The rear end of the dovetail member is engaged by a finger 25 which extends radially from a hollow sleeve 26 disposed circumferentially about a pin (not shown) which has one end thereof secured to a knob 27 and the other end threaded into mounting block 24. A spring (not shown) is disposed within the sleeve and cooperates between the sleeve and the mounting block to bias the sleeve toward knob 27. By engaging finger 25 with the rear end of dovetail member 22 and by turning knob 27 to advance the sleeve into mounting block 24, a loading force of desired magnitude is applied from the spring to the dovetail member to bias the dovetail member and housing 14 toward measurement surface 17. The loading force applied to the housing is sufficient that metering wheel 15 rolls frictionally along measurement surface 17 and faithfully follows without slippage the movement of the lathe carriage relative to the lathe bed. It is preferred that the biasing force applied to the housing be at least twelve pounds to maintain proper tracking pressure between the metering wheel and the measurement surface.

It should be understood, however, that the above-specified force values apply to the structure illustrated, which structure is a Trav-A-Dial friction wheel measuring device. In a Trav-A-Dial friction wheel measuring device, the motion amplification factor (gear ratio) defined by the gear train which couples metering wheel 15 to fine indicator 21 is 60:1. It will be understood, however, that if lower motion amplification factors are involved, or if metering wheels of sizes other than the six inch circumference metering wheel encountered in the Trav-A-Dial are utilized, somewhat smaller values of biasing force may be acceptable.

It is desired that the dovetail member be snugly slidable in the mounting block during use of the device to accommodate local irregularities in measurement surface 17.

The constructional details of mounting block 24, including sleeve 26 and knob 27 are illustrated in greater detail in commonly owned Pat. 3,378,929, cited above.

In FIG. 1, the plane of rotation of the metering wheel is represented by phantom line 29, and the axis of rotation of the metering wheel is represented by phantom line 30.

Mounting block 24 is supported on the upper end of a mounting pedestal 32, the lower end of which is securely affixed to lathe carriage 11, as by bolts 33. The upper end of the pedestal terminates in a peripheral flange 34. A pair of setscrews 35 are threaded through flange 34 to abut but not penetrate the lower surface of mounting block 24. The setscrews have their upper ends disposed above flange 34. It is also preferred that screws 35 be disposed along a line which, in the completed installation of the measuring device on the lathe carriage, is perpendicular to planar measurement surface 17.

The mounting block is held down on pedestal 32 by a pair of bolts 36 which are passed through oversized holes 37 in flange 34 into threaded engagement with block 24. Bolts 36 are disposed along a line which lies midway between screws 35 and is perpendicular to the line along which the screws are disposed.

Screws 35 are adjustable in flange 34 to vary the pitch or tilt (angle $\gamma$ in FIG. 2) of the plane of wheel rotation relative to measurement surface 17 so that the effective circumference of metering wheel 15, relative to its maximum circumference, may be adjusted.

FIG. 4 is an enlarged elevation view of metering wheel 15 and shows that the wheel has a peripheral surface 40 which extends axially of the wheel between upper and lower wheel end surfaces 41 and 42, respectively. Surface 40 is convex radially outwardly of the wheel and is of essentially parti-spherical configuration. Wheel 15 has a maximum diameter indicated in FIG. 4 by —·—·— phantom line 43. The maximum diameter of the wheel is greater than six inches and is located essentially at lower wheel end surface 42; in practice, diameter 43 is located ony a few thousandths inch from end surface 42. Further, the peripheral configuration of the wheel is arranged so that the diameter of the wheel adjacent the upper end surface is less than the maximum diameter of the wheel.

FIG. 5 is a side elevation view of a metering wheel 45 of the type provided in accord with U.S. Pat. No. 3,307,265. Wheel 45 has a circumferential peripheral surface 46 which extends axially of the wheel between upper and lower wheel end surfaces 47 and 48, respectively. In FIG. 5, phantom line 49 is the line of maximum circumferential extent of the wheel and will be observed to lie essentially equidistantly between and parallel to end surfaces 47 and 48. Surface 46, like surface 40, is an essentially parti-spherical surface and is convex radially outwardly of the wheel.

As shown in FIG. 1, in use measuring device 10 is mounted to lathe carriage 11 so that the metering wheel rotates in a plane which is essentially normal to measurement surface 17 and is essentially parallel to the direction of gross relative movement of the lathe carriage along lathe bed 13. (The term "gross relative movement" is used in the present description to designate the principal intended mode of movement relied upon to operate the measuring device and to distinguish such mode of movement from those movements associated with the undesired non-reciprocal deformations which produce the repeatability errors described above.) Also as noted above, the metering wheel is forcefully biased into engagement with measurement surface 17. Where the materials which define the measurement surface and the metering wheel are different, such forceful engagement of the metering wheel with the measurement surface produces measurement errors attributable to metal elastic crowding phenomena. Thus, the metering wheel, in use, appears to be larger than the nominal six-inch circumference of the wheel which would be the effective circumference of the wheel if the device were mounted with plane 29 exactly perpendicular to measurement surface 17.

Because of their essentially parti-spherical peripheral configurations, both wheels 15 (FIG. 4) and 45 (FIG. 5), when incorporated into measuring device 10, may be used to correct for measurement errors attributable to metal elastic crowding phenomena. Such correction is achieved by tilting wheel plane of rotation 29 an appropriate amount out of precise perpendicularity to measurement surface 17, thereby to decrease the effective circumference of the wheel relative to the precisely predetermined maximum circumferential extent of the wheel by an amount adequate to compensate for the effects of metal elastic crowding. The effective circumference of the metering wheel is the line of contact about the circumference of the wheel which would be defined by all individual points of contact of the wheel with the measurement surface during rolling movement of the wheel along the surface; such individual points of contact define a line parallel to the maximum circumferential line of the wheel, and both such lines lie in planes perpendicular to the axis of rotation of the wheel.

The extent to which the device must be tilted in any given application is indicated in FIG. 2 by angle $\gamma$. That is, in the present description, angle $\gamma$ represents the amount by which the plane of rotation of the metering wheel must be moved out of exact parallelism to a plane perpendicular to measurement surface 17 to compensate for measurement errors attributable to metal elastic crowding phenomena. Angle $\gamma$ is not a constant in the absolute sense, but will vary from application to application for a given measuring instrument depending upon the values of Poisson's ratio and Young's modulus which exist for the metals defining the different measurement surfaces with which the metering wheel may be engaged.

In practice, if only measurement errors attributable to metal elastic crowding phenomena were present, the wheel plane of rotation would be disposed parallel to the direction of gross relative movement of the lathe carriage 11, for example, along lathe bed 13. That is, for the purposes of compensating for metal elastic crowding effects, the measuring device is first mounted so that its metering wheel rotates in a plane truly perpendicular to measurement surface 17 and parallel to the direction along which the device is moved upon traversing the lathe carriage along the lathe bed. Thereafter, the device is moved relative to the measurement surface by the adjustment only of screws 35, for example, to pivot metering wheel plane 29 relative to the measurement surface about the point of engagement of the metering wheel with the measurement surface, the disposition of the metering wheel relative to the measurement surface in all other respects being unaltered. Both metering wheels 15 and 45 serve these ends equally well; see U.S. Pat. No. 3,307,265.

The structures of a lathe, for example, and of mounting assembly 12 are not absolutely rigid as might normally be thought. Thus, in use when mounted to compensate for the effects of metal elastic crowding, measuring device 10 is subject to repeatability errors. To move the lathe carriage along the lathe bed, force must be applied to the carriage either via a rack and pinion drive cooperating between the carriage and the lathe bed, or via a leadscrew extending along the lathe bed and engaged with the lathe carriage. Rarely are the carriage drive forces applied to the carriage along a line pasing through the center of mass of the carriage and parallel to the length of the lathe bed. Accordingly, in moving in one direction or the other along the lathe bed, the lathe carriage is subjected to loading forces which tend to deform the lathe carriage. Such deformations may be manifested as linear deflections of the carriage along any one of three mutually perpendicular axes, or as angular deflections effective about any of these three axes, or as a combination of angular and linear deflections; in view of the complex geometry of the lathe carriage, such deflections normally are manifested as a complex of linear and angular deflections. Further, the coefficient of friction which exists between the lathe carriage and the lathe bed is rarely the same for one direction of movement of the carriage along the lathe bed as it is for reverse movement of the carriage along the bed. Acordingly, in use, the lathe carriage deflects to one degree in one manner during movement in one direction along the lathe carriage and to a different degree in an opposite manner during reverse movement of the carriage along the lathe bed. It is apparent, therefore, that the structure to which the measuring device is mounted, during use in one of its principal areas of utility, is subject to non-reciprocal deformations. To the extent that such deformations have non-reciprocal effects upon the attitude (tracking angle $\alpha$ or pitch angle $\gamma$) of the metering wheel relative to the measurement surface and upon the force with which the metering wheel is engaged with the measurement surface, such deflections produce errors in the repeatability of the measuring device. In effect, because of such non-reciprocal deflections, the machine tool manifests mechanical hysteresis which adversely affects the repeatability but not necessarily the accuracy of measurement made by the friction wheel measuring device.

Variations in the engagement force of the metering wheel with the measurement surface are significant since force is one of the variables involved to a significant degree in a description of the metal elastic crowding phenomena. Skew tracking of the metering wheel along the measurement surface relative to the direction of gross relative movement of the carriage along the lathe bed is not normally a direct source of concern as to repeatability errors. Skew tracking of the metering wheel, however, produces an effective change in the pitch $\gamma$ of the metering wheel relative to the measurement surface and also produces a difference in the force with which the metering wheel is engaged with the measurement surface. Further, the non-reciprocal deformations to which the lathe is subject during use may themselves directly produce a variation in the pitch of the metering wheel relative to the measurement surface. Pitch variations have the effect of causing the metering wheel to have one effective diameter during motion in one direction along the measurement surface and to have a different effective diameter during movement in the opposite direction along the measurement surface. That is, with reference to FIG. 4, metering wheel 15 may have an effective circumference 51 during travel in one direction along the measurement surface and a second effective circumference 52 for travel in the opposite direction, whereas the actual effective circumference 53 desired may be some effective circumference between circumferences 51 and 52; this same illustrative example is also used with reference to FIG. 5 and circumference lines 55, 56, and 57.

Compensation for repeatability errors involves two basic steps. The magnitude and sign of the repeatability error are first ascertained, and then the mounting of the measuring device is adjusted to overcome the repeatability error. The magnitude and sign of the repeatability error are determined by adjusting the device as described above to compensate for metal elastic crowding effects, by placing the lathe carriage at one end of the lathe bed against a stop, and by zeroing the indicators of the measuring device. The carriage is then cycled back and forth along the lathe bed over as great a distance as is possible until ultimately the carriage is returned to its initial position against the stop. The device will show some residual measurement indication, and the magnitude of this residual indication is the magnitude of repeatability error. Depending upon whether the residual indication is up or down relative to the original zero reading, the sign of the repeatability error is plus or minus.

To compensate for repeatability errors determined according to the above-described procedure, bolts 36 (but not screws 35) are adjusted between pedestal 32 and mounting block 24 to pivot the mounting block about the tops of screws 35, thereby to incline metering wheel plane of rotation 29 relative to the line 60 of gross relative movement by an amount $\alpha$ which is appropriate in direction and magnitude relative to line 60 to reduce the repeatability error. The direction which plane 29 is to be moved relative to line 60 is determined by reference to the dials of device 10. Bolts 36 are adjusted to cause the pointer associated with indicator dial 21 to move from the position occupied at the end of the error determination procedure back toward zero. Actually the complete adjustment procedure is carried out on an empirical basis in that an initial correction $\alpha$ is made in the attitude of the measuring device relative to the measurement surface and the error determination process is repeated to determine the magnitude and sign of the repeatability error which is produced following the initial correction. If any repeatability error is manifested following the second cycling of the lathe carriage back and forth along the lathe bed, an additional adjustment in angle α is made. The net result of the adjustment to eliminate or compensate for repeatability errors is to produce skew tracking of the metering wheel along the measurement surface relative to the line of gross movement 60. This skew tracking is very slight and does not adversely affect measurement accuracy, but is sufficient to introduce an artificial hysteresis into the system in an amount sufficient to counteract the hysteresis produced by non-reciprocal deformation in the machine tool and in the bracketry mounting the measuring device to the tool.

As noted above, skew tracking of the metering wheel along the measurement surface produces a variation in the value of angle γ programmed into the mounting assembly to compensate for measurement errors caused by elastic metal crowding phenomena. Such variations in angle γ are the result of the inherent elasticity and resiliency of the mounting assembly for measuring device 10 and of the forceful loading of the metering wheel against the measurement surface. That is, assume that the repeatability adjustment is such that movement of the measuring device from left to right (as viewed in FIG. 3) causes the metering wheel to tend to track uphill relative to line 60. As the lathe carriage is moved to the right along the lathe bed, the point of contact of the metering wheel with the measurement surface will tend to move upwardly along the measurement surface until the elasticity of mounting assembly 12 can no longer accommodate such movement; thereafter the metering wheel will track along the measurement surface with an effective circumference 52 greater than the effective circumference 53, say, desired for the purposes of compensation for metal elastic crowding phenomena. In movement from right to left as viewed in FIG. 3, the metering wheel tends to track downhill relative to line 60 and will track along the measurement surface in the opposite direction with effective circumference 51.

Because measuring device 10 is a common article of commerce familiar to many machinists, and because the measuring device has utility on many machine tools within a given machine shop and commonly is changed from one machine tool to another within a given machine shop, it is desirable that the procedures to be followed for compensation of repeatability errors be uniform. In view of the foregoing description, however, it will be apparent that the procedures which must be followed to produce compensation for repeatability errors will vary depending upon whether device 10 is tilted up or down in compensating for errors attributable to elastic metal crowding phenomena. Because measuring devices heretofore provided had metering wheels having the configuration shown in FIG. 5, such prior measuring devices could be tilted up or down relative to the measurement surface to compensate for metal elastic crowding effects; this fact makes it difficult to standardize upon a uniform repeatability error compensation technique. Also, the very fact of the nature of the prior metering wheel configurations (see FIG. 5) often made it impossible to obtain proper repeatability error compensation.

Keeping in mind the foregoing discussion regarding the manner in which the point of contact of the metering wheel with the measurement surface will migrate across the surface of metering wheel 15 in a direction parallel to axis 30 depending upon the direction in which the metering wheel moves along the measurement surface when adjusted as shown in FIG. 3 to compensate for repeatability errors, assume that the measuring device has a metering wheel of the type shown in FIG. 5 and that only a small variation in angle γ is required to compensate for elastic metal crowding phenomena. That is, with reference to FIG. 5, assume that measuring device 10 incorporates metering wheel 45, instead of metering wheel 15, that for the purposes of producing accurate measurements the metering wheel is tracked along circumference line 57 rather than circumference line 49, and that the repeatability error is of relatively large magnitude such that angle α (see FIG. 3) is substantial. In such a situation, it is apparent that the spacing axially of the metering wheel between circumference line 55 (the effective circumference line of the metering wheel for one direction of travel along the measurement surface) and circumference line 56 (the effective circumference line of the metering wheel for movement of the wheel in the opposite direction along the measurement surface) will be substantial, and that circumference lines 55 and 56 may lie on opposite sides of maximum circumference line 49. Still with reference to FIG. 5, where circumference lines 55 and 56 lie on opposite sides of maximum circumference line 49, the situation is produced in which adjustment of the metering device through angle α is ineffective to produce adequate compensation for repeatability errors. In other words, where the metering wheel has the configuration shown in FIG. 5, a situation easily may arise where the device cannot be adjusted to provide an artificial hysteresis sufficient to negate the hysteresis producing a repeatability error.

Thus, the modification of the peripheral configuration of the metering wheel from the form shown in FIG. 5 to the form shown in FIG. 4, eliminates the dilemma described above with reference to the configuration shown in FIG. 5, and also makes possible a completely uniform repeatability error correction procedure. By making the outline of the metering wheel markedly asymmetrical relative to a diametral plane centrally of the end faces of the wheel (as shown in FIG. 4) instead of symmetrical relative to such a central diametral plane, a metering wheel is produced which has been found to enable effective adjustment of the measuring device for the purposes of complete compensation for repeatability errors. Wheel 15 has the feature that the maximum diameter of such wheel is located essentially at the lower end face 42 of the wheel. Because the maximum diameter of wheel 15 is greater than six inches, the wheel must be tilted to produce accurate measurements. Because of the location of the maximum diameter of wheel 15 along the axis of the wheel, wheel 15 may be tipped only upwardly. Also, it is preferred that the radius of curvature of surface 40 in planes radially of the wheel and normal to the plane of any given circumference line be less than the diameter of the wheel so that the wheel must be tilted a substantial amount to achieve compensation for metal elastic crowding effects. The result is that, in use, measuring devices incorporating wheel 15, when adusted for compensation of repeatability errors, do not have multiple effective circumference lines, such as lines 51 and 52, lying on opposite sides of the maximum circumference line 43.

These differences between wheels 15 and 45 assure that a measuring device incorporating wheel 15 will in fact be capable of adjustment to compensate for repeatability and measurement errors, and also makes it possible to adhere to uniform procedures for overcoming the effects of non-reciprocal deformations in the machine tool and the mounting bracketry for the measuring device. These improvements markedly enhance the utility of such measuring devices in the areas in which the devices presently enjoy their greatest use.

What is claimed is:

1. In a measuring device having a rotatable circular metal metering wheel of precisely predetermined circumferential extent and having opposite end faces spaced along the axis of rotation thereof, means for rotatably mounting the wheel so that the periphery of the wheel is engageable in frictionally driven rolling engagement with a metal surface along which measurements are to be made, and means operable in response to rotation of the wheel for indicating precisely the distance the wheel mounting means moves relatively along the metal surface, the improvement comprising a peripheral surface on the metering wheel curved convexly radially outwardly of the wheel about the circumference of the wheel, the wheel peripheral surface being configured and arranged so that the line of maximum circumferential extent around the wheel lies in a plane perpendicular to the wheel axis of rotation and is substantially more proximate to one wheel end face than to the other, the outwardly convex wheel peripheral surface having a curvature in cooperation with the extent of such surface axially of the wheel sufficient that the plane of rotation of the wheel is pivotable only in one direction relative to the measurement surface to vary, by an amount adequate to compensate for localized deformation phenomena in the wheel and the measurement surface, the effective circumference of the wheel relative to said precisely predetermined circumferential extent.

2. A measuring device according to claim 1 wherein the line of maximum circumferential extent of the wheel lies essentially at the one end face.

3. A measuring device according to claim 2 wherein the maximum circumference of the metering wheel is greater than that associated with accurate measurements in the absence of differences in localized deformation phenomena in the wheel and the measurement surface.

4. A measuring device according to claim 1 wherein the radius of curvature of the wheel peripheral surface in planes radially of the wheel and normal to the plane of maximum circumference is less than the diameter of the wheel.

References Cited

UNITED STATES PATENTS 3,436,954  4/1969  Eppler _____ 71—1(A)

SAMUEL S. MATTHEWS, Primary Examiner